(12) United States Patent
Breiner et al.

(10) Patent No.: US 8,669,328 B2
(45) Date of Patent: Mar. 11, 2014

(54) COMPOSITION COMPRISING AS THE AQUEOUS DISPERSION PREFERABLY (METH)ACRYLATE POLYMERS CONTAINING BENZOPHENONE IN A MIXTURE WITH (METH)ACRYLATE POLYMERS DIFFERENT THEREFROM AND THE USE OF SAID COMPOSITION

(75) Inventors: Christine Maria Breiner, Laudenbach (DE); Mario Gomez Andreu, Pfungstadt (DE); Gerold Schmitt, Aschaffenburg (DE); Wolfgang Klesse, Mainz (DE)

(73) Assignee: Evonik Roehm GmbH, Darmstadt (DE)

( * ) Notice: Subject to any disclaimer, the term of this patent is extended or adjusted under 35 U.S.C. 154(b) by 273 days.

(21) Appl. No.: 13/201,889

(22) PCT Filed: Mar. 2, 2010

(86) PCT No.: PCT/EP2010/052575
§ 371 (c)(1),
(2), (4) Date: Aug. 17, 2011

(87) PCT Pub. No.: WO2010/108762
PCT Pub. Date: Sep. 30, 2010

(65) Prior Publication Data
US 2011/0319514 A1 Dec. 29, 2011

(30) Foreign Application Priority Data
Mar. 24, 2009 (DE) .......................... 10 2009 001 776

(51) Int. Cl.
C08L 33/04 (2006.01)
C09D 133/04 (2006.01)
C04B 41/48 (2006.01)
C08L 33/12 (2006.01)
C09D 133/12 (2006.01)
C08F 2/22 (2006.01)
C08F 2/48 (2006.01)

(52) U.S. Cl.
USPC ........... 525/210; 525/217; 525/221; 525/222; 525/241

(58) Field of Classification Search
USPC .......................... 525/210, 217, 221, 222, 241
See application file for complete search history.

(56) References Cited

U.S. PATENT DOCUMENTS

| 5,439,970 | A | 8/1995 | Reeb |
| 6,528,590 | B1 | 3/2003 | Beyer et al. |
| 2009/0186220 | A1* | 7/2009 | Palasz ..................... 428/355 AC |
| 2010/0119962 | A1* | 5/2010 | Takamatsu et al. ............. 430/56 |

FOREIGN PATENT DOCUMENTS

| DE | 198 58 851 | 6/2000 |
| EP | 0 599 676 | 6/1994 |
| EP | 1 174 401 | 1/2002 |
| EP | 1 371 694 | 12/2003 |
| JP | 5-170941 | 7/1993 |
| JP | 7-126536 | 5/1995 |
| JP | 2000-109703 | 4/2000 |
| JP | 2002-87870 | 3/2002 |
| JP | 2002-338934 | 11/2002 |
| JP | 2006-241270 | 9/2006 |
| WO | 00 63314 | 10/2000 |

OTHER PUBLICATIONS

International Search Report issued Jun. 7, 2010 in PCT/EP10/052575 filed Mar. 2, 2010.

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

The invention describes a composition comprising, in the form of aqueous dispersion, A) for every 100 parts by weight of a, or of a plurality of, (meth)acrylate polymer(s); B) from 1-400 parts by weight of a, or of a plurality of, (meth)acrylate polymer(s), which contain(s) a compound of the formula (I) copolymerized, where the (meth)acrylate polymer(s) B) differ from the (meth)acrylate polymers specified in A), where these are obtainable by emulsion polymerization of a mixture comprising a) from 0.1 to 99.9 percent by weight of at least one compound of the formula (I), preferably of a benzophenone (meth)acrylate,

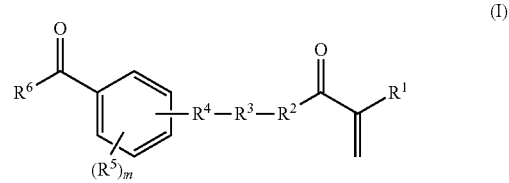

(I)

in which the definitions of the moieties are those given in the description; and b) from 99.9 to 0.1% by weight of a, or of a plurality of, ethylenically unsaturated monomer(s) which differ(s) from a) and which is/are copolymerizable with a), where components a) and b) together give 100% by weight of the polymerizable constituents of the mixture;

and where the parts by weight of A) and B) are based on the solids content of the polymers A) or B) in the aqueous dispersion.

Dispersions of this type are UV-curable and have excellent suitability for the production of coatings of any type, in particular for coating of mineral substrates, such as concrete. The dispersions of the invention are also advantageous for blending with known dispersions and improve their properties, in particular in respect of their curing profile.

19 Claims, No Drawings

COMPOSITION COMPRISING AS THE AQUEOUS DISPERSION PREFERABLY (METH)ACRYLATE POLYMERS CONTAINING BENZOPHENONE IN A MIXTURE WITH (METH)ACRYLATE POLYMERS DIFFERENT THEREFROM AND THE USE OF SAID COMPOSITION

The present invention describes a composition comprising an aqueous dispersion of A) a, or a plurality of, (meth)acrylate polymer(s) in a mixture with B) a, or a plurality of, (meth)acrylate polymer(s) which differ(s) from A) and which preferably contain(s) benzophenone. The invention also relates to the use of the aqueous dispersions described.

Polyacrylate dispersions are known in principle. For quite some time, dispersions of this type have been used for the coating of various types of substrates, for the sealing and protection of the same. An example of an application relates to the sealing of mineral substrates, such as stone, concrete, concrete roof tiles, conventional bricks and the like (in which connection cf. U.S. Pat. No. 4,511,699 and GB Patent 1 411 268).

In the case of outdoor coatings, the main issue is weathering of the material in the form of the coated substrates; the effect of weathering on these tends to cause efflorescence, which mostly appears in the form of white spots and gradually leads to damage to the mineral substrates. In the case of indoor coatings, the issue is often inadequate hardness of the covering on the coated substrate. However, it is the hardness and durability of the coating that is specifically of particular importance for the quality of coating on floors made of mineral materials, such as stone or concrete.

EP 0 355 028 A1 discloses a process in which the surfaces of substrates are coated with aqueous polyacrylate dispersions, and the coatings are then dried at an elevated temperature. This process uses, for the coating, a mixture made of A) an aqueous dispersion of strength from 20 to 65% by weight which has a minimum film-forming temperature of from −30 to +30° C. and which comprises a copolymer of
a) from 20 to 70% of its weight of (meth)acrylates of alkanols which contain from 3 to 20 carbon atoms and which have a tertiary CH group,
b) from 30 to 60% of its weight of styrene, alpha-methylstyrene, methyl methacrylate, tert-butyl (meth)acrylate and/or (meth)acrylonitrile and
c) from 0.2 to 7% of its weight of mono- and/or dicarboxylic acids having from 3 to 5 carbon atoms and/or amides of these optionally substituted at the N atom by an alkyl group containing from 1 to 4 carbon atoms and
B) from 0.1 to 5% by weight, based on the amount of the copolymer present in component (A), of an aromatic ketone.

The mixture is then irradiated with ultraviolet light for hardening prior to or after drying.

According to EP 0 355 028 A1, an example of an aromatic ketone that can be used is inter alia benzophenone or a benzophenone derivative, such as 3,3'-dimethyl-4-methoxybenzophenone, 3- and 4-hydroxybenzophenone, benzophenone-2-carboxylic acid, benzophenone-3-carboxylic acid, benzophenone-4-carboxylic acid and the like, and 2-, 3- and 4-phenylbenzophenone, 2-, 3- and 4-alkylbenzophenones having from 1 to 10 carbon atoms in the alkyl moieties, e.g. 2-, 3- and 4-methylbenzophenone, 2-, 3-, 4-nonylbenzophenone, and dialkylbenzophenones, and also olefinically unsaturated and water-soluble benzophenone derivatives.

Although the coatings of EP 0 355 028 A1 do provide satisfactory durability of the covering, the coatings are nevertheless still in need of improvement, in particular in respect of properties such as resistance to, inter alia, weathering, to solvents, and to organic and inorganic chemicals, and in respect of properties such as the hardness of the covering, the drying rate of the coating and the like.

Benzophenone and low-molecular-weight benzophenone derivatives are per se widely used photoinitiators. Irradiation forms free radicals, which can bring about polymerization or crosslinking of ethylenically unsaturated monomers.

Carlini et al. report in Polymer, 1983, Vol. 24, May, pages 599 ff. on polymers whose side chain contains benzophenone chromophores, and on the use of these as highly effective photoinitiators. Copolymers of acryloxybenzophenone with menthyl acrylate, methyl acrylate or 1-acryloxy-2-ethoxyethane are disclosed. The copolymers described have about 10 to 90 mol % of acryloxybenzophenone units and are suitable for the photoinitiation of the polymerization reaction. The publication mentioned does not provide any exact specification of the molecular weight of the proposed photoinitiators.

U.S. Pat. No. 5,900,472 A describes copolymerizable benzophenone photoinitiators. Benzophenones having from two to four (meth)acrylate groups are revealed, and UV-curable coverings are proposed which are obtainable via reaction of the polyfunctional benzophenone derivatives with (meth) acrylate on exposure to radiation. According to U.S. Pat. No. 5,900,472 A, the coverings obtainable by using the polyfunctional benzophenones are superior to the coatings known hitherto using known photoinitiators insofar as they exhibit less tendency towards "efflorescence" (migration). Unused photoinitiator has previously tended to cause this phenomenon, and its use was therefore greatly restricted.

In view of the prior art mentioned and discussed in the introduction, it was an object of the invention to provide novel compositions for the coating of any substrate.

The intention here is to minimize the cost of the components of the coating composition, or to maximize the capability to produce these from simple starting materials in a simple manner by standard processes.

The composition itself is intended to have maximum ease of use and maximum versatility. The intention here is that the composition comply with all technical specifications and also in particular that it minimize any hazard to health. In this context, the intention is to include consideration of freedom from VOC (no volatile organic compounds) in the composition.

However, the intention is that the composition not only has maximum ease of obtainability and use but also maximizes the variety of different types of substrates on which coverings can be produced with a maximum level of good properties.

A further intention is to maximize the curing rate and completeness of curing and/or drying of the coverings.

A further intention is that the coverings and coatings have improved durability. To this end, the intention is that the curing process be capable of achieving maximum quality of crosslinking of the coating, i.e. complete and intensive crosslinking.

A further intention is to minimize "efflorescence" (migration) from the coverings resulting from the composition of the invention, in such a way that the amount of substances emitted into the environment is also zero or minimized. The intention is therefore to minimize or eliminate any alteration in the coverings over the course of time.

A further intention is that the resultant coatings and coverings have minimum absorbency for organic solvents. A particular intention is that the coverings have minimum MEK (methyl ethyl ketone) swelling, which can be taken as an index of a high degree of crosslinking (high hardness) of the coatings.

The coatings and coverings resulting from the compositions of the invention are intended to have improved stability combined with high hardness.

A further intention is that the coatings and coverings of the invention permit maximum universality of use with known dispersions for the coating process, the aim here being to permit controlled adjustment of the properties of the known dispersions (by using blends to increase the value of the known dispersions).

The objects of the invention, or one or more aspect(s) of the objects of the invention, are achieved through using a composition comprising, in aqueous dispersion:
A) for every 100 parts by weight of a, or of a plurality of, (meth)acrylate polymer(s);
B) from 1-400 parts by weight of a, or of a plurality of, (meth)acrylate polymer(s) which contain(s) one or more compounds of the formula (I) copolymerized, where the (meth)acrylate polymers B) differ from the (meth)acrylate polymers mentioned in A), and where the (meth)acrylate polymers B) are obtainable by emulsion polymerization of a mixture comprising
a) from 0.1 to 99.9 percent by weight of at least one compound of the general formula (I), preferably of a benzophenone (meth)acrylate,

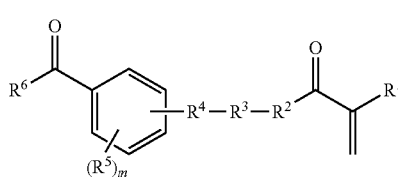

in which $R^1$ is hydrogen or methyl;
$R^2$ is oxygen or NH;
$R^3$ is a moiety of the general formula II

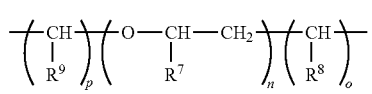

in which
$R^7$, $R^8$, and $R^9$, independently of one another, are hydrogen or methyl,
n is a whole number from zero to two hundred,
o and p, independently of one another, are a whole number from zero to two, where $R^3$ is a bond if the total of n and o and p is zero;
$R^4$ is a bond, oxygen, NH, O—CO—O, HN—CO—O, HN—CO—NH or sulphur;
$R^5$ is hydrogen, halogen or a moiety having from one to 20 carbon atoms and if appropriate having substitution by oxygen, by nitrogen and/or by sulphur, where m is a whole number from one to four; and
$R^6$ is an aryl or heterocyclyl moiety; and
b) from 99.9 to 0.1% by weight of a, or of a plurality of, ethylenically unsaturated monomer(s) which differ(s) from a) and which is/are copolymerizable with a), where components a) and b) together give 100% by weight of the polymerizable constituents of the mixture;

and where the parts by weight of A) and B) are based on the solids content of the polymers A) or B) in the aqueous dispersion.

A composition of this type permits, in a manner which is not readily foreseeable, the production of coatings or coverings in particular on mineral substrates with extremely advantageous properties, by incorporating polymer-bonded UV-curable (meth)acrylate polymers in acrylate dispersions known per se.

Other particular advantages of the system of the composition of the invention are that there is no need to use additional photoinitiators for the UV curing process and that no migration of the UV-active portion is expected, since the UV-active substance has been incorporated in the form of copolymerized monomer into the corresponding coating.

Another point worthy of note is that the preferably benzophenone-containing compounds present in the composition of the invention are primarily monomers which bring about hardening by way of UV crosslinking in dispersions, and are not polymeric photoinitiators. This is a significant difference from the known prior art.

The compositions of the invention comprise the constituent A) in aqueous dispersion. This is a (meth)acrylate polymer or a mixture of two or more (meth)acrylate polymers which differ from one another. For the purposes of the invention, the term (meth)acrylate means acrylates and/or methacrylates.

The (meth)acrylate polymers A) are homo- or copolymers. The (meth)acrylate polymers in the form of homopolymers are obtainable by polymerization of monomers. Monomers that can be used are, inter alia, preferably: acrylates and/or methacrylates of alkanols having from 1 to 24, in particular from 1 to 12 carbon atoms, e.g. methyl, ethyl, propyl, isoamyl, isooctyl, n-butyl, isobutyl and tert-butyl, cyclohexyl, 2-ethylhexyl, decyl, lauryl and stearyl acrylate and/or the corresponding methacrylate.

Copolymers generally contain, as main monomers, predominant proportions which are mostly from 50 to 99.99% by weight, preferably from 70 to 97.5% by weight of the acrylates and/or methacrylates which were mentioned for the homopolymers and which derive from alkanols having from 1 to 24 carbon atoms. Examples of comonomers that can be used are vinyl esters of saturated carboxylic acids containing from 1 to 20, in particular from 2 to 3, carbon atoms, e.g. vinyl formate, vinyl acetate, vinyl propionate, and vinyl laurate and vinyl stearate, and vinyl ethers having from 3 to 22 carbon atoms, e.g. methyl, ethyl, butyl, hexyl, or octadecyl vinyl ether, vinylaromatics having from 8 to 12 carbon atoms, particularly styrene or U-methylstyrene, vinyltoluenes, tert-butylstyrene and halogenated styrenes, olefins having from 2 to 20 carbon atoms, e.g. particularly ethylene, propylene and n- and isobutylene, diisobutene, triisobutene and oligopropylenes and/or vinyl halides, e.g. particularly vinyl chloride and vinylidene chloride and allyl ether or allyl esters. Other compounds of particular interest are those copolymers which contain, as comonomers, in addition to other acrylates and methacrylates, from 0.5 to 20% by weight, based on the copolymers, preferably from 2 to 10% by weight, of tetrahydrofurfuryl 2-acrylate or -methacrylate and/or monomers containing alkoxy groups, e.g. 3-methoxybutyl (meth)acrylate, 2-methoxyethyl (meth)acrylate, 2-butoxyethyl (meth)acrylate, 2-ethoxyethyl (meth)acrylate, N-butoxymethyl (meth)acrylamide and/or N-isobutoxymethyl(meth)acrylamide copolymerized, preference being given here to tetrahydrofurfuryl 2-acrylate and -methacrylate and 3-methoxybutyl acrylate and the corresponding methacrylate.

The copolymers particularly advantageously also contain from 0.1 to 10% by weight, preferably from 0.5 to 4% by weight, of alpha, beta-monoolefinically unsaturated mono- and/or dicarboxylic acids containing from 3 to 5 carbon atoms and/or their amides or, if appropriate, monoalkyl esters or anhydrides of the dicarboxylic acids copolymerized.

Particular examples of these are acrylic and methacrylic acid and itaconic acid, and crotonic acid, fumaric acid, maleic acid, maleic anhydride, mono-n-butyl maleate, monoethyl fumarate, monomethyl itaconate and monomethyl maleate. Among the amides of carboxylic acids of this type, acrylamide and methacrylamide are of particular interest. Other suitable compounds are N-methylacrylamide and -methacrylamide, N-methylolacrylamide and -methacrylamide, the mono- and diamide of maleic acid, the mono- and diamide of itaconic acid and the mono- and diamide of fumaric acid. In some cases it is also possible to use amounts of from 0.1 to 5% by weight, based on the copolymers, of vinylsulphonic acid or vinylphosphonic acids.

Other comonomers that can be used in amounts of up to 30% by weight, preferably from 0.5 to 5% by weight, are olefinically unsaturated tertiary amino compounds, e.g. N,N-dimethyl-, N,N-diethylaminoethyl(meth)-, N,N-diisopropyl (meth)-, and N,N-dibutyl(meth)acrylamide and the corresponding (meth)acrylate compound, dimethyl- and diethylaminoethyl vinyl ether, N-vinylimidazole, N-vinylimidazoline, vinylpyridines, dialkyl(meth)acrylamides, N-vinylformamide, N-vinylpyrrolidone, N-vinylcaprolactam, the p-hydroxyanilide of (meth)acrylic acid, N-tert-butyl (meth)acrylamide, diacetone(meth)acrylamide, N-(1-methylundecyl)(meth)acrylamide, N-isobornyl(meth)acrylamide, N-adamantyl(meth)acrylamide, N-benzyl(meth)acrylamide, N-4-methylphenyl- and methyl(meth)acrylamide, N-diphenylmethylacrylamide, phthalimidomethyl(meth)acrylamide, (meth)acrylamidohydroxyacetic acid, (meth)acrylamidoacetic acid, (meth)acrylamidoacetates such as methyl (meth) acrylamidoacetate, 2-(meth)acrylamido-2-methylbutyric acid, N-(2,2,2-trichloro-1-hydroxy)ethyl(meth)acrylamide, N,N-bis(2-cyanoethyl)methacrylamide, N-(1,1,1-trishydroxymethyl), methyl(meth)acrylamide and N-(3-hydroxy-2,2-dimethylpropyl)(meth)acrylamide. Other compounds that may be mentioned are 2-hydroxy-3-[N,N-di(2-hydroxyethyl)]propyl (meth)acrylate, 2-methoxy-3-[N,N-di(2-hydroxyethyl)propyl (meth)acrylate, 2-hydroxy-34N-hydroxyethyl-N-alkyl]propyl (meth)acrylate and/or 2-hydroxy-3-[N, N-dialkyl]propyl (meth)acrylate having from 1 to 10 carbon atoms in the alkyl moiety, e.g. 2-hydroxy-3-[N-hydroxyethyl-N-methyl]propyl (meth)acrylate and 2-hydroxy-3-[N-ethyl-N-methyl]propyl methacrylate.

Other compounds that can be used are amounts of up to 30% by weight, preferably from 0.1 to 25% by weight, with particular preference from 0.5 to 20% by weight of monoolefinically unsaturated monomers of the type represented by 3-cyclohexylpropyl 1-(meth)acrylate, cyclohexyl (meth)acrylate, 4-tert-butylcyclohexyl (meth)acrylate, 2-N-morpholinoethyl (meth)acrylate, 2-N-morpholino-N-hexyl (meth)acrylate and furfuryl (meth)acrylate, isobornyl (meth) acrylate, N-cyclohexyl (meth)acrylate and N-isobornyl (meth)acrylate.

The copolymers can also comprise further monomers having functional groups copolymerized in amounts of up to 20% of their weight, examples being hydroxyalkyl (meth)acrylates, such as 2-hydroxypropyl (meth)acrylate, 2-hydroxyethyl (meth)acrylate, and 4-hydroxybutyl (meth)acrylate and glycidyl acrylate and the corresponding methacrylate. Other comonomers that can be advantageous in some instances are monoacrylates and monomethacrylates of polyetherols or of propoxylated fatty alcohols, for example of molecular weight from 200 to 10 000 or of polyethoxylated alkanols and/or phenols, in amounts of from 0.5 to 10% by weight.

Compositions of particular interest are characterized by way of example in that the (meth)acrylate polymer A) has been selected from methyl methacrylate, butyl acrylate and methacrylic acid or from a mixture which encompasses two or all three of the abovementioned components. Very particularly advantageous compositions encompass, as component A), a copolymer which encompasses methyl methacrylate, butyl acrylate and methacrylic acid, and specifically in a ratio of from 55:44:1 to 45:54:1, based on the total of the weights of the three constituents mentioned of A) as 100 percent by weight.

The (meth)acrylate (co)polymers A) can be produced by (co)polymerization of the monomeric components using the usual polymerization initiators and, if appropriate, using chain-transfer agents; the polymerization reaction here is carried out at the usual temperatures in bulk, in emulsion, e.g. in water or in liquid hydrocarbons, or in solution. It is preferable to obtain polymers A) by emulsion polymerization. The polymers in aqueous emulsion are then directly available for further processing. If the polymers A) are produced in bulk or solution, the polymers can be isolated and then, after subsequent purification if appropriate, can be subjected to a further process to give an aqueous dispersion.

If solution polymerization is used to produce component A) it can be advantageous in particular to carry out the polymerization in solvents whose boiling range is from 50 to 150° C., preferably from 60 to 120° C., using the usual amounts of polymerization initiators, which are generally from 0.01 to 10, in particular from 0.1 to 4% by weight, based on the total weight of the monomers. Particular solvents that can be used are alcohols, such as methanol, ethanol, n- and isopropanol, and n- and isobutanol, preferably isopropanol and/or isobutanol, and hydrocarbons, such as toluene and in particular petroleum spirit whose boiling range is from 60 to 120° C. It is also possible to use ketones, such as acetone, and ethyl ethyl ketone and esters, such as ethyl acetate, and mixtures of solvents of the type mentioned, preference being given here to mixtures which comprise amounts of from 5 to 95% by weight, in particular from 10 to 80% by weight, preferably from 25 to 60% by weight, based on the solvent mixture used, of isopropanol and/or isobutanol.

Examples of polymerization initiators that can be used in the solution polymerization process are 2,2'-azobisisobutyronitrile, acyl peroxides, such as benzoyl peroxide, dilauroyl peroxide, didecanoyl peroxide and isononanoyl peroxide, alkyl peresters such as tert-butyl perpivalate, tert-butyl 2-ethylperhexanoate, tert-butyl permaleate, tert-butyl perisononanoate and tert-butyl perbenzoate, dialkyl peroxides such as dicumyl peroxide, tert-butyl peroxide, di-tert-butyl peroxide and peroxodicarbonates, such as dimystril peroxodicarbonate, bicetyl peroxodicarbonate, bis(4-tert-butylcyclohexyl) peroxodicarbonate, dicyclohexyl peroxodicarbonate and di-2-ethylhexyl peroxodicarbonate, hydroperoxides such as cumene hydroperoxide and tert-butyl hydroperoxide, and polymerization initiators such as 3,4-dimethyl-3,4-diphenylhexane and 2,3-dimethyl-2,3-diphenylbutane. Particularly preferred polymerization initiators are ketone peroxides, such as methyl ethyl ketone peroxide, acetylacetone peroxide, cyclohexanone peroxide and methyl isobutyl ketone peroxide.

After the polymerization reaction in solution, the solvents can, if appropriate, be removed under reduced pressure, operating at elevated temperatures, for example, in the range from 100 to 150° C. The polymers and copolymers in solvent-free condition can then be dispersed in water.

In some instances it is also advantageous to produce the polymers and copolymers by polymerization in bulk, i.e. without any concomitant use of a solvent, and it is possible here to operate batchwise or continuously, e.g. according to the information given in U.S. Pat. No. 4,042,768.

As mentioned above, it is particular preference for the invention that the polymers and copolymers are produced directly in aqueous dispersion by emulsion polymerization.

The procedure for emulsion polymerization is in principle familiar to the person skilled in the art. The emulsifier is first dissolved in water. At a certain concentration of the emulsifier (CMC critical micelle concentration) micelles form, and the polymer chains can then grow within these. The monomer is then added and finally free radicals are generated. This can be achieved by adding a free-radical generator that decomposes thermally (mostly peroxides or azo compounds) and heating the mixture above the decomposition temperature of the free-radical generator. As an alternative, free radicals can also be generated by photochemical decomposition without heating (an example being azobisisobutyronitrile AIBN) or by suitable redox reactions (e.g. between ammonium peroxodisulphate and ascorbic acid). Initially, small polymer free radicals form in the aqueous phase, and once these have been subject to an addition reaction with some of the sparingly water-soluble monomers they develop an affinity for the hydrophobic interiors of the micelles, into which they diffuse, thus allowing the reaction to continue in those locations. It is also possible that a polymer particle initially generated undergoes an addition reaction with emulsifier, thus forming a micelle around itself. The particles that form in the micelles are then known as latex particles. The micelle wall made of emulsifier acts in principle like a membrane, thus permitting diffusion of further monomers into the micelle, with resultant continuation of the polymerization reaction. Further emulsifier molecules arrive and can, as it were, provide concomitant growth of the micelle wall. Assuming that an excess of initiator is present, the polymerization reaction continues until all of the monomer has been consumed.

In the emulsion polymerization reaction of component A) it is also possible to make concomitant use of the usual amounts of conventional chain-transfer agents, examples being amounts of from 0.1 to 15% by weight, preferably from 2 to 10% by weight, based on the monomers. Examples of chain-transfer agents of this type are mercapto compounds, such as 2-mercaptoethanol, methyl 3-mercaptopropionate, 3-mercaptopropionic acid, 1,6-dimercaptohexane, 1,9-dimercaptononane, hydrocarbons, such as cumene, alcohols, such as isopropanol or isobutanol or halogenated hydrocarbons, such as carbon tetrachloride, tetrabromomethanol, chloroform or bromoform. Preferred chain-transfer agents are compounds such as 3-mercaptopropionic acid, 3-mercapto-1,2-propanediol, 2-mercaptoethanol, glycerol and di- and triglycerides. It is moreover possible to use ethers as chain-transfer agents, examples being dioxane and tetrahydrofuran.

The composition of the invention comprises, for every 100 parts (weight) of component A), from 1 to 400 parts (weight) of component B).

Component B) is a copolymer which is obtainable by polymerization of a monomer mixture which encompasses, as an essential monomer component, one or more compounds a) of the general formula (I). The proportion of the compound(s) a) in the monomer mixture used to obtain component B) is in the range from 0.1 to 99.9 percent by weight, based on the total weight of the polymerizable constituents for component B) (entirety of a) and b)).

A advantageous amount of the monomers of the formula (I) present is in the range from 0.5 to 50 percent by weight, in particular in the range from 2.0 to 35.0 percent by weight and very preferably in the range from 5.0 to 30.0 percent by weight in the monomer mixture, based in each case on the total weight of the polymerizable constituents (a total of a) and b)).

The monomer a) is at least one compound of the general formula (I)

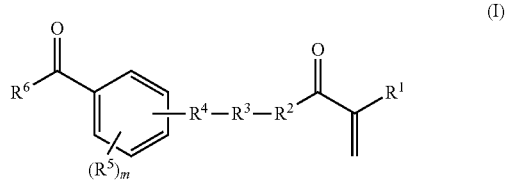

in which $R^1$ is hydrogen or methyl;
$R^2$ is oxygen or NH;
$R^3$ is a moiety of the general formula II

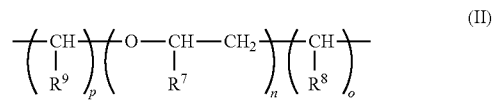

in which
$R^7$, $R^8$, and $R^9$, independently of one another, are hydrogen or methyl,
n is a whole number from zero to two hundred,
o and p, independently of one another, are a whole number from zero to two, where $R^3$ is a bond if the total of n and o and p is zero;
$R^4$ is a bond, oxygen, NH, O—CO—O, HN—CO—O, HN—CO—NH or sulphur;
$R^5$ is hydrogen, halogen or a moiety having from one to 20 carbon atoms and if appropriate having substitution by oxygen, by nitrogen and/or by sulphur, where m is a whole number from one to five; and
$R^6$ is an aryl or heterocyclyl moiety advantageously arranged in conjugation with the adjacent carbonyl group.

In one advantageous embodiment of the process of the invention, the moiety $R^1$ is a methyl group.

In another particularly preferred variant of the process, compounds of the formula (I) are used in which the moiety $R^2$ is oxygen.

Other particularly advantageous compounds of the formula (I) are those in which $R^1$ is a methyl group and $R^2$ is oxygen. This combination involves methacryloyl moieties.

As is apparent from this example, the intention is that throughout the further course of the description combinations and permutations of the preferred or advantageous variants of the process are included in the invention and the disclosure, in particular in respect of the use of the compound of the formula (I) having particularly preferred and/or advantageous moieties.

In a further advantageous embodiment of the process of the invention, compounds of the formula (I) are used in which $R^3$ and/or $R^4$ have been selected in such a way that the linkage of the polymerizable ethylenically unsaturated function occurs by way of spacers in the form of ethylene oxide moieties or propylene oxide moieties. To this end, it is preferable that the selection of the moiety $R^3$ is such that the sum of the indices n+o+p is greater than zero. It is particularly advantageous to select o and p to be zero while n is a whole number greater than zero, particularly advantageously greater than five and still more preferably greater than 10.

An advantageous variant selects all of the moieties $R^7$ to $R^9$ to be hydrogen.

However, compounds of the formula (I) in which all of the moieties $R^7$ to $R^9$ are methyl are also of great interest.

One particularly advantageous variant of the process is achieved by using compounds of the formula (I) in which $R^1$ is methyl, $R^2$ is oxygen, $R^4$ is a bond, p and o are zero, $R^7$ is hydrogen, and the index n is a whole number in the range from 1 to 50, particularly preferably 2 to 20 and still more preferably from 5 to 10.

$R^5$ is hydrogen, halogen, or a moiety which has from 1 to 20 carbon atoms and which, if appropriate, has substitution by oxygen, by nitrogen and/or by sulphur, where m is from 1 to 4.

Particularly advantageous variants of the invention use compounds of the formula (I) in which all four of the moieties $R^5$ are hydrogen.

The moiety $R^6$ is an aryl moiety or a heterocyclyl moiety. $R^6$ is particularly advantageously an aryl moiety. It is particularly preferable that $R^6$ is a phenyl moiety.

The linkage of the moiety fragment —$R^4$—$R^3$—$R^2$— to the aromatic system can take place in o-, m- or p-position with respect to the carbonyl function on the aromatic system. Paralinkage is preferred, i.e. 1,4-linkage.

In one particularly advantageous embodiment of the invention, the monomer a) is at least one benzophenone (meth)acrylate of the general formula (I')

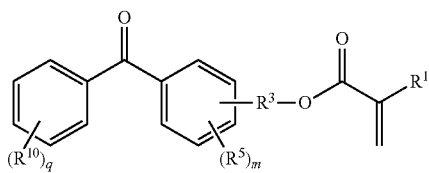

(I')

in which $R^1$, $R^3$ and $R^5$ and m can be defined as above for formula (I).

$R^{10}$ can, independently of $R^5$, be defined as for $R^5$, namely being hydrogen or halogen or a moiety which has from 1 to 20 carbon atoms and which, if appropriate, has substitution by oxygen, by nitrogen and/or by sulphur, where q is from 1 to 5.

One very particularly preferred embodiment of the invention is directed at those processes in which the compounds used as compounds a) comprise those of the general formula (I"). Here, the monomer a) is at least one benzophenone (meth)acrylate of the general formula I"

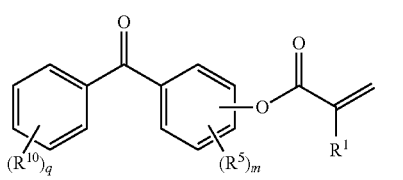

(I")

in which $R^1$, $R^5$ and $R^{10}$ and m and q are defined as previously for formulae (I) and (I').

In the context of the formulae and moieties here, and throughout the description unless otherwise stated, halogen means the moieties fluorine, chlorine, bromine or iodine.

A non-exclusive list of the moieties which have from 1 to 20 carbon atoms includes inter alia (C1-C20)-alkyl, (C2-C20)-alkenyl, (C2-C20)-alkynyl, aryl or heterocyclyl, where the aryl or heterocyclyl moieties can be unsubstituted or can have up to three identical or different moieties as substituents, or in the case of fluorine can have up to the maximum number, and, in the alkyl, alkenyl or alkynyl moieties mentioned, one or more non-adjacent saturated carbon units, preferably up to three, can have been replaced by heteroatom units, such as oxygen or sulphur, where moreover from 3 to 6 atoms of these hydrocarbon moieties, if appropriate modified as above, can form a cyclic system, and these hydrocarbon moieties, with or without the stated variations, can, if appropriate, have substitution by one or more, preferably up to three, and in the case of halogen up to the maximum number of, identical or different moieties from the group of halogen, preferably fluorine, aryl, aryloxy, arylthio, (C3-C8)-cycloalkoxy, (C3-C8)-cycloalkylthio, heterocyclyl, heterocyclyloxy or (C1-C2)-alkoxycarbonyl, where the cycloaliphatic, aromatic or heterocyclic ring systems can be unsubstituted or can have up to three identical or different substituents from among the substituents mentioned immediately above, or in the case of fluorine can also have up to the maximum number.

The expression "(C1-C20)-alkyl" means an unbranched or branched hydrocarbon moiety having from 1 to 20 carbon atoms, e.g. the methyl, ethyl, propyl, isopropyl, 1-butyl, 2-butyl, 2-methylpropyl or tert-butyl moiety; or else, for example, the pentyl, 2-methylbutyl, 1,1-dimethylpropyl, hexyl, heptyl, octyl, or 1,1,3,3-tetramethylbutyl moiety; or else, for example, the nonyl, 1-decyl, 2-decyl, undecyl, dodecyl, pentadecyl or eicosyl moiety;

and the expression "(C2-C20)-alkenyl" means, for example, the vinyl, allyl, 2-methyl-2-propenyl or 2-butenyl group; or else, for example, the 2-pentenyl, 2-decenyl or 2-eicosenyl group;

and the expression "(C2-C20)-alkynyl" means, for example, the ethynyl, propargyl, 2-methyl-2-propynyl or 2-butynyl group; or else, for example, the 2-pentynyl or 2-decynyl group;

and the expression "aryl" means an isocyclic aromatic moiety preferably having from 6 to 14, in particular from 6 to 12 carbon atoms, e.g. phenyl, naphthyl or biphenylyl, preferably phenyl.

The expression "aryloxy" means, for example, the phenoxy or 1- or 2-naphthyloxy group;

the expression "arylthio" means, for example, the phenylthio or 1- or 2-naphthylthio group;

the expression "(C3-C8)-cycloalkoxy" means a cyclopropyl, cyclobutyl, cyclopentyl, cyclohexyl, cycloheptyl or cyclooctyl group, linked by way of an oxygen atom;

and the expression "(C3-C8)-cycloalkylthio" means a cyclopropyl, cyclobutyl, cyclopentyl, cyclohexyl, cycloheptyl or cyclooctyl group linked by way of a sulphur atom.

The expression "heterocyclyl" means a heteroaromatic or heteroaliphatic ring system, and "heteroaromatic ring system" here means an aryl moiety in which at least one CH group has been replaced by N and/or at least two adjacent CH groups have been replaced by S, NH or O, examples being a moiety of thiophene, furan, pyrrole, thiazole, oxazole, imidazole, isothiazole, isoxazole, pyrazole, 1,3,4-oxadiazole, 1,3,4-thiadiazole, 1,3,4-triazole, 1,2,4-oxadiazole, 1,2,4-thiadiatole, 1,2,4-triazole, 1,2,3-triazole, 1,2,3,4-tetrazole, benzo[b]thiophene, benzo[b]furan, indole, benzo[c]thiophene, benzo

[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, pyrazine, pyrimidine, pyridazine, 1,3,5-triazine, 1,2,4-triazine, 1,2,4,5-triazine, quinoline, isoquinoline, quinoxaline, quinazoline, cinnoline, 1,8-naphthyridine, 1,5-naphthyridine, 1,6-naphthyridine, phthalazine, pyridopyrimidine, purine, pteridine or 4H-quinolizine;

the expression "heteroaliphatic ring system" means a cycloalkyl moiety in which at least one carbon unit has been replaced by O, S or an NR" group and R" is hydrogen, (C1-C4)-alkyl or aryl;

the expression "heterocyclyloxy" means any of the above-mentioned heterocyclic moieties linked by way of an oxygen atom;

and (C1-C2)-alkoxycarbonyl means the methoxycarbonyl or ethoxycarbonyl group.

As mentioned above, in a preferred embodiment of the invention the compositions are characterized in that $R^1$ is methyl.

Compositions in which $R^2$ is oxygen are also of particular interest.

Compositions in which $R^4$ is a bond are also of particular interest.

Compositions in which p=o=zero and n is a whole number from 1 to 20 are also of particular interest. In this case it is particularly advantageous that $R^7$=hydrogen.

Another alternative preference is that p=o=n=zero.

Compositions in which all of the $R^5$ are hydrogen are also of particular interest.

Compositions in which $R^6$ is phenyl are also of particular interest.

It is very particularly advantageous that methacryloyloxybenzophenone or benzophenone methacrylate is used as component a) for producing a polymer B) for the composition of the invention.

The compounds of the formulae (I), (I') and (I") can either be purchased or are produced by processes known from the literature. Among the possible production processes are by way of example transesterification of (meth)acrylates with the corresponding alcohols or alcohol precursor compounds.

The monomer composition for component B) further encompasses one or more ethylenically unsaturated comonomers b), which is/are copolymerizable with a) but which differ(s) therefrom. The proportion of the comonomers is preferably in the range from 99.9 to 0.01% by weight, in particular from 50.0 to 99.5% by weight, advantageously from 65.0 to 98.0% by weight and particularly preferably from 70.0 to 35.0% by weight, based on the weight of the polymerizable constituents (sum of the weights of a)+b)).

Comonomers b) that are suitable in this context comply by way of example with the formula (III):

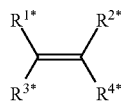

(III)

in which $R^{1*}$ and $R^{2*}$ have been independently selected from the group consisting of hydrogen, halogens, CN, linear or branched alkyl groups having from 1 to 20, preferably from 1 to 6, and particularly preferably from 1 to 4, carbon atoms, which can have from 1 to (2n+1) halogen atoms as substituents, where n is the number of carbon atoms of the alkyl group (an example being $CF_3$), α,β-unsaturated linear or branched alkenyl or alkynyl groups having from 2 to 10, preferably from 2 to 6, and particularly preferably from 2 to 4, carbon atoms, which can have from 1 to (2n−1) halogen atoms, preferably chlorine, as substituents, where n is the number of carbon atoms of the alkyl group, an example being $CH_2$=CCl—, cycloalkyl groups having from 3 to 8 carbon atoms, which can have from 1 to (2n−1) halogen atoms, preferably chlorine, as substituents, where n is the number of carbon atoms of the cycloalkyl group; aryl groups having from 6 to 24 carbon atoms, which can have from 1 to (2n−1) halogen atoms, preferably chlorine, and/or alkyl groups having from 1 to 6 carbon atoms, as substituents, where n is the number of carbon atoms of the aryl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}_2$, $P(=Y^*)R^{5*}_2$, $Y^*PR^{5*}_2$, $Y^*P(=Y^*)R^{5*}_2$, $NR^{8*}_2$, where these can have been quaternized with an additional $R^{8*}$ group, aryl group or heterocyclyl group, where $Y^*$ can be $NR^{8*}$, S or O, preferably O; $R^{5*}$ is an alkyl group having from 1 to 20 carbon atoms, alkylthio having from 1 to 20 carbon atoms, $OR^{15}$ (where $R^{15}$ is hydrogen or an alkali metal), alkoxy having from 1 to 20 carbon atoms, aryloxy or heterocyclyloxy; $R^{6*}$ and $R^{7*}$ are independently hydrogen or an alkyl group having from 1 to 20 carbon atoms, or $R^{6*}$ and $R^{7*}$ can together form an alkylene group having from 2 to 7, preferably from 2 to 5, carbon atoms, where they form a 3- to 8-membered, preferably 3- to 6-membered, ring, and $R^{8*}$ is hydrogen or linear or branched alkyl or aryl groups having from 1 to 20 carbon atoms;

$R^{3*}$ and $R^{4*}$ are independently selected from the group consisting of hydrogen, halogen (preferably fluorine or chlorine), alkyl groups having from 1 to 6 carbon atoms and $COOR^{9*}$, in which $R^{9*}$ is hydrogen, an alkali metal or an alkyl group having from 1 to 40 carbon atoms, or $R^{1*}$ and $R^{3*}$ together can form a group of the formula $(CH_2)_{n'}$, which can have from 1 to 2n' halogen atoms or $C_1$-$C_4$-alkyl groups as substituents, or of the formula C(=O)—$Y^*$—C(=O), where n' is from 2 to 6, preferably 3 or 4, and $Y^*$ is defined as above; and where at least 2 of the moieties $R^{1*}$, $R^{2*}$, $R^{3*}$ and $R^{4*}$ are hydrogen or halogen.

Among these compounds are inter alia:
aryl (meth)acrylates, such as benzyl methacrylate or
phenyl methacrylate, where the aryl moieties can respectively be unsubstituted or have up to four substituents;
methacrylates of halogenated alcohols, e.g.
2,3-dibromopropyl methacrylate,
4-bromophenyl methacrylate,
1,3-dichloro-2-propyl methacrylate,
2-bromoethyl methacrylate,
2-iodoethyl methacrylate,
chloromethyl methacrylate;
vinyl halides, e.g. vinyl chloride, vinyl fluoride, vinylidene chloride and vinylidene fluoride;
vinyl esters, such as vinyl acetate;
styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, e.g. monochlorostyrenes, dichlorostyrenes, tribromostyrenes and tetrabromostyrenes;
heterocyclic vinyl compounds, e.g. 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles, and hydrogenated vinyloxazoles; vinyl and isoprenyl ethers;
maleic acid and maleic acid derivatives, e.g. maleic anhydride, methylmaleic anhydride, maleimide, methylmaleimide;
fumaric acid and fumaric acid derivatives;
acrylic acid and methacrylic acid;
dienes, such as divinylbenzene;
hydroxyalkyl (meth)acrylates, e.g.
3-hydroxypropyl methacrylate,
3,4-dihydroxybutyl methacrylate,
2-hydroxyethyl methacrylate,
2-hydroxypropyl methacrylate,
2,5-dimethyl-1,6-hexanediol (meth)acrylate,
1,10-decanediol (meth)acrylate;
carbonyl-containing methacrylates, e.g.
2-carboxyethyl methacrylate,
carboxymethyl methacrylate,
oxazolidinylethyl methacrylate,
N-(methacryloyloxy)formamide,
acetonyl methacrylate,
N-methacryloylmorpholine,
N-methacryloyl-2-pyrrolidinone,
N-(2-methacryloyloxyethyl)-2-pyrrolidinone,
N-(3-methacryloyloxypropyl)-2-pyrrolidinone,
N-(2-methacryloyloxypentadecyl)-2-pyrrolidinone,
N-(3-methacryloyloxyheptadecyl)-2-pyrrolidinone;
glycol dimethacrylates, e.g.
1,4-butanediol methacrylate,
2-butoxyethyl methacrylate,
2-ethoxyethoxymethyl methacrylate,
2-ethoxyethyl methacrylate;
methacrylates of ether alcohols, e.g.
tetrahydrofurfuryl methacrylate,
vinyloxyethoxyethyl methacrylate,
methoxyethoxyethyl methacrylate,
1-butoxypropyl methacrylate,
1-methyl-(2-vinyloxy)ethyl methacrylate,
cyclohexyloxymethyl methacrylate,
methoxymethoxyethyl methacrylate,
benzyloxymethyl methacrylate,
furfuryl methacrylate,
2-butoxyethyl methacrylate,
2-ethoxyethoxymethyl methacrylate,
2-ethoxyethyl methacrylate,
allyloxymethyl methacrylate,
1-ethoxybutyl methacrylate,
methoxymethyl methacrylate,
1-ethoxyethyl methacrylate,
ethoxymethyl methacrylate and ethoxylated (meth)acrylates, these preferably having from 1 to 20, in particular from 2 to 8, ethoxy groups;
aminoalkyl (meth)acrylates and aminoalkyl (meth)acrylate amides, e.g.
N-(3-dimethylaminopropyl)methacrylamide,
dimethylaminopropyl methacrylate,
3-diethylaminopentyl methacrylate,
3-dibutylaminohexadecyl (meth)acrylate;
nitriles of (meth)acrylic acid; other nitrogen-containing methacrylates, e.g.
N-(methacryloyloxyethyl)diisobutyl ketimine,
N-(methacryloyloxyethyl)dihexadecyl ketimine,
methacryloylamidoacetonitrile,
2-methacryloyloxyethylmethylcyanamide,
cyanomethyl methacrylate;
heterocyclic (meth)acrylates, e.g.
2-(1-imidazolyl)ethyl (meth)acrylate,
2-(4-morpholinyl)ethyl (meth)acrylate and
1-(2-methacryloyloxyethyl)-2-pyrrolidone;
oxiranyl methacrylates, e.g.
2,3-epoxybutyl methacrylate,
3,4-epoxybutyl methacrylate,
10,11-epoxyundecyl methacrylate,
2,3-epoxycyclohexyl methacrylate,
10,11-epoxyhexadecyl methacrylate; and
glycidyl methacrylate;

Among particularly suitable comonomers b) are inter alia methacrylates, acrylates, styrenes and mixtures which encompass two or more components from the abovementioned groups. Examples of (meth)acrylates are methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, ethylhexyl (meth)acrylate, cyclohexyl (meth)acrylate, tetrahydrofurfuryl (meth)acrylate, isobornyl (meth)acrylate, benzyl (meth)acrylate, phenyl (meth)acrylate, phenylethyl (meth)acrylate, 3,3,5-trimethylcyclohexyl (meth)acrylate, hydroxyethyl (meth)acrylate, hydroxypropyl (meth)acrylate, methyl- or ethyltriglycol methacrylate, butyldiglycol methacrylate, ethylene glycol di(meth)acrylate, and also diethylene glycol di(meth)acrylate, triethylene glycol di(meth)acrylate and higher homologues of these, dipropylene glycol di(meth)acrylate, tripropylene glycol di(meth)acrylate and higher homologues of these, 1,3- and 1,4-butanediol di(meth)acrylate, 1,6-hexanediol di(meth)acrylate, 1,12-dodecanediol di(meth)acrylate, glyceryl di(meth)acrylate, trimethylolpropane tri(meth)acrylate, trimethylolpropane di(meth)acrylate, tri(meth)acrylate of an ethoxylated trimethylolpropane having from 3 to 10 mol of ethylene oxide, di(meth)acrylate of an ethoxylated bisphenol A having from 2 to 20 mol of ethylene oxide, preferably from 2 to 10 mol of ethylene oxide and/or a polyethylene glycol dimethacrylate having from 1 to 15 ethylene oxide units and allyl (meth)acrylate. Other examples are (meth)acrylic acid, (meth)acrylamide, N-methylol(meth)acrylamide, monoesters of maleic and succinic acid with hydroxyethyl methacrylate and the phosphoric esters of hydroxyethyl (meth)acrylate, the proportions of these compounds mostly being relatively low.

Another point that will be understood is that it is also possible to use a plurality of types of monomers b) for the production of a polymer B). By way of example, component B) can also be obtained by polymerization of two or more monomers which differ from one another and are of the type b).

Selection of component b) from (meth)acrylate monomers is of particular interest for the invention. It is very particularly preferable here that component b) is methyl methacrylate.

In another embodiment, it is preferable that component b) comprises n-butyl methacrylate.

Particular polymers of the invention are also obtainable by using a component b) selected from (meth)acrylates having from 3 to 5 carbon atoms in the ester group. Among these are inter alia propyl methacrylate, n-butyl methacrylate, tert-butyl methacrylate and n-pentyl methacrylate. Among the monomers mentioned, particular preference is given to n-butyl methacrylate.

Equally, a feature of particular polymers of the invention is that b) is a mixture of monomers comprising methyl methacrylate and n-butyl methacrylate.

Very particularly preferred compositions of the invention are characterized in that component b) has been selected from methyl methacrylate, butyl acrylate and methacrylic acid or from mixtures which encompass two or all three of the abovementioned components.

Compositions to which even more preference is given are those that result when b) encompasses methyl methacrylate, butyl acrylate and methacrylic acid, particularly advantageously in a ratio of from 55:44:1 to 45:54:1, based on the sum of the weights of the three constituents mentioned of b) as 100 percent by weight.

The polymers B) present in the composition of the invention are generally obtained like the polymers A), by free-radical polymerization. The conventional free-radical polymerization reaction is described in detail inter alia in Ullmanns' Encyclopedia of Industrial Chemistry, Sixth Edition.

For the purposes of the present invention, the polymerization reaction is initiated by using at least one polymerization initiator for the free-radical polymerization reaction. Among these are inter alia the azo initiators well known to persons skilled in the art, e.g. 2,2'-azobisisobutyronitrile, 2,2'-azobis(2,4-dimethylvaleronitrile) and 1,1-azobiscyclohexanecarbonitrile, organic peroxides, such as dicumyl peroxide, diacyl peroxides, such as dilauroyl peroxide, peroxodicarbonates, such as diisopropyl peroxodicarbonate, peresters, such as tert-butyl 2-ethylperoxyhexanoate, and the like.

Very particularly suitable polymerization initiators for the purposes of the present invention in particular encompass the following compounds:
methyl ethyl ketone peroxide,
acetylacetone peroxide,
dilauroyl peroxide,
tert-butyl 2-ethylperhexanoate,
ketone peroxide,
tert-butyl peroctoate,
methyl isobutyl ketone peroxide,
cyclohexanone peroxide,
dibenzoyl peroxide,
tert-butyl peroxybenzoate,
tert-butylperoxy isopropyl carbonate,
2,5-bis(2-ethylhexanoylperoxy)-2,5-dimethylhexane,
tert-butyl 2-ethylperoxyhexanoate,
tert-butyl 3,5,5-trimethylperoxyhexanoate,
dicumyl peroxide,
1,1-bis(tert-butylperoxy)cyclohexane,
1,1-bis(tert-butylperoxy)-3,3,5-trimethylcyclohexane,
cumyl hydroperoxide,
tert-butyl hydroperoxide,
bis(4-tert-butylcyclohexyl) peroxydicarbonate,
2,2'-azobisisobutyronitrile,
2,2'-azobis(2,4-dimethylvaleronitrile),
1,1-azobiscyclohexanecarbonitrile,
diisopropyl peroxydicarbonate,
tert-amyl peroxypivalate,
di(2,4-dichlorobenzoyl) peroxide,
tert-butyl peroxypivalate,
2,2'-azobis(2-amidinopropane) dihydrochloride,
di(3,5,5-trimethylhexanoyl) peroxide,
dioctanoyl peroxide,
didecanoyl peroxide,
2,2'-azobis(N,N'-dimethyleneisobutyramidine),
di(2-methylbenzoyl) peroxide,
dimethyl 2,2'-azobisisobutyrate,
2,2'-azobis(2-methylbutyronitrile),
2,5-dimethyl-2,5-di(2-ethylhexanoylperoxy)hexane,
4,4'-azobis(cyanopentanoic acid),
di(4-methylbenzoyl) peroxide,
dibenzoyl peroxide,
tert-amyl 2-ethylperoxyhexanoate,
tert-butyl 2-ethylperoxyhexanoate,
tert-butyl peroxyisobutyrate,
and mixtures of the abovementioned polymerization initiators.

The polymers of the invention can be obtained in bulk or else in solution. However, it is preferable to obtain them by polymerization in accordance with the emulsion polymerization reaction described in more detail at an earlier stage above in connection with component A).

The polymerization reaction to produce the polymers B) can be carried out either in the presence or in the absence of a chain-transfer agent. It is preferable that the polymerization reaction is carried out in the presence of a chain-transfer agent. Chain-transfer agents that can be used are the typical species described at an earlier stage above for free-radical polymerization reactions.

It is particularly advisable to use mercaptans, examples being n-butyl mercaptan, n-dodecyl mercaptan, 2-mercaptoethanol, 2-ethylhexyl thioglycolate or pentaerythrityl tetrathioglycolate; the amounts used here of the chain-transfer agents are preferably from 0.05 to 5.0% by weight, preferably from 0.1 to 2.0% by weight and particularly preferably from 0.2 to 1.0% by weight, based in each case on the total weight of the ethylenically unsaturated compounds. In this connection, the person skilled in the art can refer to the technical literature, in particular the following publications: H. Rausch-Puntigam, T. Völker "*Acryl-und Methacrylverbindungen*" [Acrylic and methacrylic compounds] Springer, Heidelberg, 1967; Houben-Weyl "*Methoden der organischen Chemie*" [Methods of organic chemistry] Vol. XIV/1, pp. 66ff., Georg Thieme, Heidelberg, 1961 and Kirk-Othmer "*Encyclopedia of Chemical Technology*" Vol. 1, pp. 296ff., J. Wiley, New York, 1978. For the purposes of the present invention, very particular preference is given to the use of 2-ethylhexyl thioglycolate or pentaerythrityl tetrathioglycolate as chain-transfer agent. In one preferred embodiment, the amount used of these is from 0.05 to 5% by weight, based on the total weight of components a) and b).

The molar mass of the copolymers of type B) containing benzophenone (meth)acrylate can vary widely. For the purposes of the present invention, the amounts of monomers, polymerization initiator, chain-transfer agent and, if appropriate, solvent are preferably selected in such a way as to give a weight-average molar mass in the range from $10^3$ to $10^6$ g/mol, preferably in the range from $10^4$ to less than $10^6$ g/mol, advantageously in the range from $2 \times 10^4$ to less than $10^6$ g/mol, in particular in the range from $5 \times 10^4$ to less than $10^6$ g/mol. Molar masses are particularly preferably in the range from $10^5$ to $10^6$ g/mol. These values are in each case based on weight-average molar mass (Mw).

The molar masses can be determined by known methods. By way of example, gel permeation chromatography can be used, this also being termed "Size Exclusion Chromatography" (SEC). An osmometric method can also be used to determine the molar masses, an example being "Vapour Phase Osmometry". The methods mentioned are described by way of example in P. J. Flory, "Principles of Polymer Chemistry" Cornell University Press (1953), Chapter VII, 266-316, and also "Macromolecules, an Introduction to Polymer Science", F. A. Bovey and F. H. Winslow, Editors, Academic Press (1979), 296-312, and also W. W. Yau, J. J. Kirkland and D. D. Bly, "Modern Size Exclusion Liquid Chromatography", John Wiley and Sons, New York, 1979. It is preferable to use gel permeation chromatography to determine the molar masses of the polymers proposed herein. Measurements should preferably be made against polymethyl acrylate standards or against polyacrylate standards.

The polymerization reaction to obtain the polymers of the invention can be carried out at atmospheric pressure, superatmospheric pressure or subatmospheric pressure. The polymerization temperature is also non-critical. However, it is generally in the range from −20° C. to 200° C., preferably in the range from 0° C. to 180° C., advantageously in the range from 50° C. to 180° C., and particularly preferably in the range from 50° C. to 130° C., and in particular in the range from 60° C. to 120° C.

The polymerization reaction is preferably carried out at a constant reaction temperature which preferably varies by less than +/−20° C., particularly preferably by less than +/−10° C., in particular by less than +/−5° C., around the desired temperature during the entire polymerization reaction.

To this end, the polymerization vessel is preferably surrounded by a medium which can provide maximum speed and efficiency in dissipating the heat generated in the polymerization reaction. In order to achieve a further reduction of temperature variations, it has proved very advantageous to use the rate of addition of the polymerization initiator to control the temperature in the polymerization vessel, by briefly increasing the rate of addition of the polymerization initiator in order to increase the temperature and briefly reducing the rate of addition of the polymerization initiator in order to reduce the temperature.

Another advantageous procedure is to use the reaction mixture encompassing the ethylenically unsaturated compounds as initial charge in a reaction vessel, to control the temperature of the reaction mixture by using a suitable temperature-controlled medium to give the desired polymerization temperature until the reaction mixture exhibits the desired polymerization temperature, to initiate the polymerization reaction through addition or metering-in of the polymerization initiator and, directly after the addition or directly after the process of metering-in of the polymerization initiator has begun, to reduce the temperature of the temperature-controlled medium in comparison with the temperature initially set, preferably by from 2 to 10° C., in particular by from 5 to 10° C.

The compositions of the invention comprise, as a function of application sector, for every 100 parts by weight of polymer A), about 1 to 400 parts by weight of polymer B), where the amounts stated are based on the solids content of the dispersion. Particularly advantageous compositions comprise, for every 100 parts of A), about 100 parts to 350 parts (w/w) of component B). These have excellent suitability as protective coverings for mineral substrates. Very particularly advantageous compositions comprise, for every 100 parts of A), about 200 to 300 parts of B).

The compositions of the invention can be further adapted to various application sectors through conventional further processing or modification. By way of example, the following may be added: conventional tackifying resins, e.g. hydrocarbon resins, optionally modified colophony resins, terpenephenol resins, ketone resins, aldehyde resins, or homopolymers, such as poly-2-ethylhexyl acrylate and poly-n-butyl acrylate, and also plasticizers, e.g. those based on mono-, di- or polyester compounds, on polychlorinated hydrocarbons or on paraffin oils; it is also possible to add dyes and pigments, or stabilizers or elastomeric substances, such as natural rubber or synthetic rubber, polyvinyl ethers and also polybutadiene oils. Other materials that can be used for the modification process are mono- or polyolefinically unsaturated compounds of relatively high molecular weight, e.g. acrylic-acid-esterified polyesterols and polyetherols, for example tripropylene glycol acrylate, tetraethylene glycol acrylate, polyethylene glycol diacrylate, and polytetrahydrofuran. Other suitable materials are diacrylates and dimethacrylates of polytetrahydrofuran with molecular weights which are mostly from 250 to 2000 (number average). Amounts that can be used with advantage of these at least diolefinically unsaturated compounds are from 0.1 to 10% by weight, based on the weight of the solids content of the composition, and diolefinically unsaturated compounds of this type with molecular weight (number average) of at least 500 are of particular interest here.

The compositions are suitable in particular in the form of aqueous dispersions for the production of coverings, coatings and impregnation systems, and also by way of example for the manufacture of pressure-sensitive adhesives, of pressure-sensitive adhesive foils and of pressure-sensitive adhesive labels, and also foils for devices that produce embossed labels. However, particularly preferred application sectors are coating of mineral substrates, such as concrete, in particular of floors. The compositions here can be applied in a manner which is per se conventional, by spreading, spraying, rolling, doctoring or pouring, if appropriate at an elevated temperature—mostly in the temperature range from 20 to 150° C.—to conventional substrates, for example to glass, concrete, brick, stone, paper, paperboard, wood, metals and plastics foils, e.g. composed of plasticized PVC, polyethylene, polyamides, or polyethylene glycol terephthalate, or aluminium, or else polypropylene.

The water present in the aqueous dispersion can easily be removed by evaporation from the coverings, if appropriate at room temperature or at slightly elevated temperatures, generally at temperatures of from 20 to 150, preferably from 50 to 80° C., using radiant heaters or hot-air-circulation apparatuses in a manner which is conventional per se. The optionally dried or predried materials can then be crosslinked via irradiation with UV light, giving coverings that have good adhesion and high cohesion and good peel resistance together with excellent ageing resistance. The operations can be carried out in air, with no need for irradiation under inert gas. The UV sources used can comprise the conventional sources, e.g. low-, medium- and high-pressure mercury-vapour lamps, with power ratings of, for example, from 80 to 160 W/cm. Lamps with relatively high power here can give quicker crosslinking. In some instances, the IR provided by the lamps can remove residual solvent or water simultaneously with the crosslinking irradiation process.

It is very particularly advantageous to use the composition of the invention to produce UV-curable coverings, coatings and impregnation systems, and in particular for the coating of mineral substrates and very particularly advantageously here for the coating of concrete, especially of concrete floors. In another embodiment of the invention, mixtures of the above-mentioned dispersions with other dispersions whose solids differ from those of the dispersions of the invention are particularly advantageous. The properties of the known dispersions are advantageously upgraded here, for example in respect of mechanical strength and the like. Particularly advantageous mixtures of dispersions are those where the quantitative ratio (w/w) present is from 1:99 to 99:1, based on the solids content in the dispersion.

Particularly advantageous blends are obtained if the dispersion of the invention (benzophenone dispersion) is used after blending with single-component aliphatic polyurethane dispersions, with aqueous dispersions using modified acrylate copolymers (sometimes having anionic and cationic functional groups) and/or with wax emulsions (e.g. ethylene copolymer emulsions). In all cases, even small additions of a dispersion of the invention, for example in the range of from 1 to 50 parts by weight, based on the solids content of the dispersion, to 100 parts by weight, likewise based on the solids content, of the dispersion that differs from the dispersions of the invention, is sufficient to obtain a dramatic upgrade of the mechanical properties of the other dispersions. Particularly advantageous uses are those in which the amount added is in the range from 2 to 50 parts by weight. Still more preference is given to admixture of from 3 to 30 parts by weight. It is very particularly advantageous to use amounts in the range from 4 to 25 parts by weight, still more preferably from 5 to 20 parts by weight.

The inventive examples and comparative examples below provide further explanation of the invention
Production of the Emulsion Polymers All of the emulsion polymers were produced by the feed process.

INVENTIVE EXAMPLE 1

468.3 g of butyl acrylate (BA), 490.0 g of methyl methacrylate (MMA), 32.75 g of methacryloyloxybenzophenone, 10 g of methacrylic acid (MAA), 1.8 g of ammonium peroxodisulphate (APS), 6.67 g of Disponil FES 32 (30% strength) and 613.2 g of water were first emulsified at 4000 rpm for three minutes in a PE beaker by means of an Ultra-Turrax.

390 g of water and 0.833 g of Disponil FES 32 (30% strength) were used as initial charge in a glass reactor which had been equipped with a vane stirrer and the temperature of which could be controlled by a water bath; the initial charge was heated to 80° C. and 0.2 g of ammonium peroxodisulphate (APS) dissolved in 10 g of water was admixed. 5 minutes after the APS addition, the emulsion previously produced was metered into this mixture over a period of 240 minutes (timing: feed duration 3 minutes, pause duration 4 minutes, remainder of feed duration 237 minutes).

Once the feed had ended, stirring was continued at 80° C. for one hour. The mixture was then cooled to room temperature and the dispersion was discharged through a filter by way of a stainless steel mesh sieve with mesh width 0.09 mm.

The emulsion produced had solids content of 50±1%, pH of 3, viscosity of 300 mPas and $r_{N5}$ value of 69 nm.

Once the feed had ended, 2.2 g of 25% strength ammonia solution was used for neutralization and 42.86 g of 70% strength aqueous Triton X 305 solution was used for post-stabilization. 5.73 g of 25% strength ammonia solution was used for final neutralization.

Particle radius was determined by PCS (Photon Correlation Spectroscopy), and the data stated here are based on the r50 value (50% of particles smaller, 50% larger). A Beckman Coulter N5 Submicron Particle Size Analyzer was used for this.

Various methods were used to study the properties of the resultant coating composition, by using dried films for tests of solvent resistance and hardness.

Solvent resistance was determined using methyl isobutyl ketone (MIBK), by swelling a specimen with MIBK for 4 hours at room temperature. The specimen was then withdrawn from the solvent and excess solvent was removed. The specimen was then dried at about 140° C. for 1 hour. The weight loss is used to calculate the proportion of the specimen removed by the solvent.

Table 1 lists the results obtained.

For comparison, acrylic dispersions comprising no UV-crosslinking monomers were tested. Table 1 shows the results obtained.

COMPARATIVE EXAMPLE 1

432 g of butyl acrylate (BA), 360 g of methyl methacrylate (MMA), 8 g of methacrylic acid (MAA), 2.4 g of ammonium peroxodisulphate (APS), 24.0 g of Disponil FES 32 (30% strength) and 718.4 g of water were first emulsified at 4000 rpm for three minutes in a PE beaker by means of an Ultra-Turrax.

470 g of water and 0.6 g of Disponil FES 32 (30% strength) were used as initial charge in a glass reactor which had been equipped with a vane stirrer and the temperature of which could be controlled by a water bath; the initial charge was heated to 80° C. and 0.6 g of ammonium peroxodisulphate (APS) dissolved in 10 g of water was admixed. 5 minutes after the APS addition, the emulsion previously produced was metered into this mixture over a period of 240 minutes (timing: feed duration 3 minutes, pause duration 4 minutes, remainder of feed duration 237 minutes).

Once the feed had ended, stirring was continued at 80° C. for one hour. The mixture was then cooled to room temperature and the dispersion was discharged through a filter by way of a stainless steel mesh sieve with mesh width 0.09 mm.

The emulsion produced had solids content of 40±1%, pH of 8.3 (after neutralization with 4 g of 25% strength ammonia solution), viscosity of 13 mPas and $r_{N5}$ value of 97 nm.

Tests of solvent resistance and of mechanical stability were carried out on dried films.

COMPARATIVE EXAMPLE 2

352 g of butyl acrylate (BA), 440 g of methyl methacrylate (MMA), 8 g of methacrylic acid (MAA), 2.4 g of ammonium peroxodisulphate (APS), 24.0 g of Disponil FES 32 (30% strength) and 718.4 g of water were first emulsified at 4000 rpm for three minutes in a PE beaker by means of an Ultra-Turrax.

470 g of water and 0.6 g of Disponil FES 32 (30% strength) were used as initial charge in a glass reactor which had been equipped with a vane stirrer and the temperature of which could be controlled by a water bath; the initial charge was heated to 80° C. and 0.6 g of ammonium peroxodisulphate (APS) dissolved in 10 g of water was admixed. 5 minutes after the APS addition, the emulsion previously produced was metered into this mixture over a period of 240 minutes (timing: feed duration 3 minutes, pause duration 4 minutes, remainder of feed duration 237 minutes).

Once the feed had ended, stirring was continued at 80° C. for one hour. The mixture was then cooled to room temperature and the dispersion was discharged through a filter by way of a stainless steel mesh sieve with mesh width 0.09 mm.

The emulsion produced had solids content of 40±1%, pH of 8.6 (after neutralization with 4 g of 25% strength ammonia solution), viscosity of 11 mPas and $r_{N5}$ value of 90 nm.

Tests of solvent resistance and of mechanical stability were carried out on dried films.

INVENTIVE EXAMPLE 2

The acrylate dispersions listed in comparative examples 1 and 2 were diluted with water to 40% solids content and then mixed in various ratios with the UV-curable dispersion listed in inventive example 1:

2a Comp. ex. 1 with Inv. ex. 1 25/75
2b Comp. ex. 1 with Inv. ex. 1 50/50
2c Comp. ex. 1 with Inv. ex. 1 75/25
2d Comp. ex. 2 with Inv. ex. 1 25/75
2e Comp. ex. 2 with Inv. ex. 1 50/50
2f Comp. ex. 2 with Inv. ex. 1 75/25

The films of dispersion are irradiated by means of a Philips UV lamp (intensity from 0.9 to 1 mW/cm$^2$), and after each of 0.5 h, 4 h and 24 h specimens are taken and tested and a comparison is made with the zero value.

TABLE 1

| | Properties of the coatings after 24 h of UV irradiation | | | | | | | | |
|---|---|---|---|---|---|---|---|---|---|
| Test | Inv. ex. 1 | Comp. ex. 1 | Comp. ex. 2 | Inv. ex. 2a | 2b | 2c | 2d | 2e | 2f |
| Swelling in MIBK [%] | 255 | dissolved | dissolved | 902 | 349 | 262 | 843 | 335 | 239 |
| Swelling in ethanol [%] | 77 | 305 | 169 | 140 | 113 | 84 | 107 | 93 | 87 |
| Tensile strain at break [%] | 148 | 488.3 | — | 425.8 | 210.5 | 196.9 | 163.3 | 162.4 | 168.5 |
| Tensile strength [MPa] | 9.2 | 3.7 | — | 8.8 | 9.6 | 14.9 | 14.3 | 15.3 | 19.6 |

The results obtained show that, in comparison with the straight acrylic dispersion, solvent absorption in MIBK and ethanol and tensile strength are markedly improved.

Another factor of particular interest is that a finished dispersion designed for floor coatings can be blended in a mixture with a dispersion of the invention comprising a, or a plurality of, compounds of the formula (I), preferably a, or a plurality of, benzophenone (meth)acrylates, and the blends exhibit marked advantages in comparison with the straight, unmixed dispersion.

The invention claimed is:

1. A composition comprising a dispersion of at least one (meth)acrylate polymer A) and at least one (meth)acrylate polymer B) in water, wherein:
for every 100 parts by weight of the (meth)acrylate polymer A) there is from 1-400 parts by weight of the (meth)acrylate polymer B);
the (meth)acrylate polymer B) comprises at least one compound of formula (I) copolymerized and different from the (meth)acrylate polymer A);
the polymers A) and B) are obtained by emulsion polymerization of a mixture comprising:
a) from 0.1 to 99.9 percent by weight of the at least one compound of formula (I);

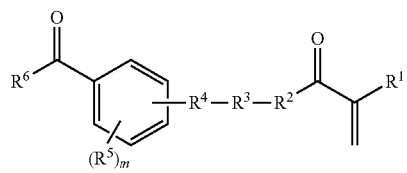

(I)

wherein:
$R^1$ is hydrogen or methyl;
$R^2$ is oxygen or NH;
$R^3$ is a moiety of formula (II):

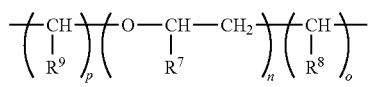

(II)

wherein:
$R^7$, $R^8$, and $R^9$, independently of one another, are hydrogen or methyl;
n is a whole number of from zero to two hundred; and
o and p, independently of one another, are a whole number of from zero to two, wherein $R^3$ is a bond if a sum of n, o and p is zero;
$R^4$ is a bond, oxygen, NH, NH, O—CO—O, HN—CO—O, HN—CO—NH or sulphur;
$R^5$ is hydrogen, halogen, a moiety having from one to 20 carbon atoms, or optionally a moiety with 1 to 20 carbon atoms and substituted by an atom selected from the group consisting of oxygen, nitrogen, and sulphur;
m is a whole number of from one to five; and
$R^6$ is an aryl or a heterocyclyl moiety;
and b) from 99.9 to 0.1% by weight of at least one ethylenically unsaturated monomer, which differs from, and is copolymerizable with, the at least one compound of formula (I),
wherein:
the at least one compound of formula (I) and the at least one ethylenically unsaturated monomer together give 100% by weight of polymerizable constituents of the mixture; and
the parts by weight of the (meth)acrylate polymer A) and the (meth)acrylate polymer B) are based on a solids content of the (meth)acrylate polymers A) or B) in the dispersion.

2. The composition of claim 1, wherein $R^1$ is methyl.

3. The composition of claim 1, wherein $R^2$ is oxygen.

4. The composition of claim 1, wherein $R^4$ is a bond.

5. The composition of claim 1, wherein o and p equal zero and n is a whole number of from 1 to 20.

6. The composition of claim 5, wherein $R^7$ is hydrogen.

7. The composition of claim 1, wherein o, p and n equal zero.

8. The composition of claim 1, wherein all of the $R^5$ are hydrogen.

9. The composition of claim 1, wherein $R^6$ is phenyl.

10. The composition of claim 1, wherein the at least one ethylenically unsaturated monomer is at least one (meth)acrylate monomer.

11. The composition of claim 10, wherein the at least one ethylenically unsaturated monomer is at least one selected from the group consisting of methyl methacrylate, butyl acrylate, and methacrylic acid.

12. The composition of claim 11, wherein the at least one ethylenically unsaturated monomer comprises methyl methacrylate, butyl acrylate and methacrylic acid in a ratio of from 55:44:1 to 45:54:1, based on a total weight of the methyl methacrylate, the butyl acrylate and the methacrylic acid as 100 percent by weight.

13. The composition of claim 1, wherein the (meth)acrylate polymer A) is obtained by copolymerization of monomers selected from the group consisting of methyl methacrylate, butyl acrylate, methacrylic acid, and a mixture thereof.

14. The composition of claim 13, wherein the (meth)acrylic polymer A) comprises methyl methacrylate, butyl acrylate and methacrylic acid, in a ratio of from 55:44:1 to 45:54:1, based on a total combined weight of the methyl methacrylate, the butyl acrylate and the methacrylic acid as 100 percent by weight.

15. A process for producing a UV curable covering, a coating, or an impregnation system, the process comprising:
introducing a composition comprising a dispersion of at least one (meth)acrylate polymer A) and at least one (meth)acrylate polymer B) in water to a production of a UV curable covering, a coating, or an impregnation system in need thereof,
wherein:
for every 100 parts by weight of the (meth)acrylate polymer A) there is from 1-400 parts by weight of the (meth)acrylate polymer B);
the (meth)acrylate polymer B) comprises at least one compound of formula (I) copolymerized and different from the (meth)acrylate polymer A);
the polymers A) and B) are obtained by emulsion polymerization of a mixture comprising:
a) from 0.1 to 99.9 percent by weight of the at least one compound of formula (I);

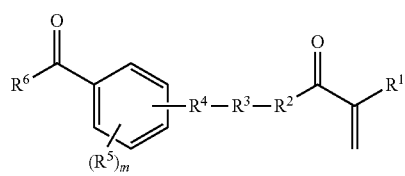

(I)

wherein:
$R^1$ is hydrogen or methyl;
$R^2$ is oxygen or NH;
$R^3$ is a moiety of formula (II):

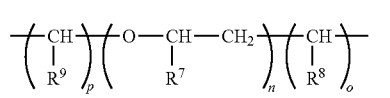

(II)

wherein:
$R^7$, $R^8$, and $R^9$, independently of one another, are hydrogen or methyl;
n is a whole number of from zero to two hundred; and
o and p, independently of one another, are a whole number of from zero to two, wherein $R^3$ is a bond if a sum of n, o and p is zero;
$R^4$ is a bond, oxygen, NH, O—CO—O, HN—CO—O, HN—CO—NH or sulphur;
$R^5$ is hydrogen, halogen, a moiety having from one to 20 carbon atoms, or optionally a moiety with 1 to 20 carbon atoms and substituted by an atom selected from the group consisting of oxygen, nitrogen, and sulphur;

m is a whole number of from one to five; and
$R^6$ is an aryl or a heterocyclyl moiety;
and
b) from 99.9 to 0.1% by weight of at least one ethylenically unsaturated monomer, which differs from, and is copolymerizable with, the at least one compound of formula (I),
wherein:
the at least one compound of formula (I) and the at least one ethylenically unsaturated monomer together give 100% by weight of polymerizable constituents of the mixture; and
the parts by weight of the (meth)acrylate polymer A) and the (meth)acrylate polymer B) are based on a solids content of the (meth)acrylate polymers A) or B) in the dispersion.

16. A process for coating a mineral substrate, the process comprising:
applying a composition comprising a dispersion of at least one (meth)acrylate polymer A) and at least one (meth)acrylate polymer B) in water to the mineral substrate,
wherein:
for every 100 parts by weight of the (meth)acrylate polymer A) there is from 1-400 parts by weight of the (meth)acrylate polymer B);
the (meth)acrylate polymer B) comprises at least one compound of formula (I) copolymerized and different from the (meth)acrylate polymer A);
the polymers A) and B) are obtained by emulsion polymerization of a mixture comprising:
a) from 0.1 to 99.9 percent by weight of the at least one compound of formula (I);

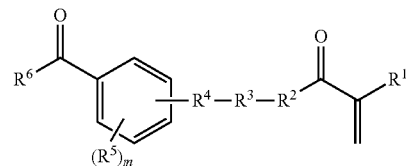

(I)

wherein:
$R^1$ is hydrogen or methyl;
$R^2$ is oxygen or NH;
$R^3$ is a moiety of formula (II):

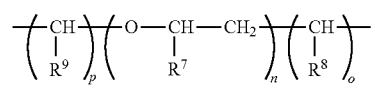

(II)

wherein:
$R^7$, $R^8$, and $R^9$, independently of one another, are hydrogen or methyl;
n is a whole number of from zero to two hundred; and
o and p, independently of one another, are a whole number of from zero to two, wherein $R^3$ is a bond if a sum of n, o and p is zero;
$R^4$ is a bond, oxygen, NH, O—CO—O, HN—CO—O, HN—CO—NH or sulphur;
$R^5$ is hydrogen, halogen, a moiety having from one to 20 carbon atoms, or optionally a moiety with 1 to 20 carbon atoms and substituted by an atom selected from the group consisting of oxygen, nitrogen, and sulphur;

m is a whole number of from one to five; and $R^6$ is an aryl or a heterocyclyl moiety;

and b) from 99.9 to 0.1% by weight of at least one ethylenically unsaturated monomer, which differs from, and is copolymerizable with, the at least one compound of formula (I), wherein:

the at least one compound of formula (I) and the at least one ethylenically unsaturated monomer together give 100% by weight of polymerizable constituents of the mixture; and the parts by weight of the (meth)acrylate polymer A) and the (meth)acrylate polymer B) are based on a solids content of the (meth)acrylate polymers A) or B) in the dispersion.

17. The process of claim 16, wherein the mineral substrate is concrete.

18. The process of claim 15, wherein the composition is mixed with at least one other dispersion whose solids differ from those of the dispersion.

19. The process of claim 18, wherein a quantitative ratio (w/w) of a mixture of the composition and the at least one other dispersion is from 1:99 to 99:1, based in each case on a dry weight of the dispersion and the at least one other dispersion.

\* \* \* \* \*